United States Patent
Burfoot

[15] 3,704,648
[45] Dec. 5, 1972

[54] THREAD MILLING ATTACHMENT FOR ENGINE LATHES

[72] Inventor: Walter S. Burfoot, 1734 Billings St., Sarasota, Fla. 33581

[22] Filed: July 12, 1971

[21] Appl. No.: 161,559

[52] U.S. Cl.....................90/11.62, 10/139 R, 82/5, 408/137
[51] Int. Cl................................................B23g 1/32
[58] Field of Search.................90/11.62, 11.4; 82/5; 10/139 R; 408/137

[56] References Cited

UNITED STATES PATENTS 2,290,395   7/1942   Van Ness et al.................90/11.62 X Primary Examiner—Gil Weidenfeld
Attorney—Ernest H. Schmidt

[57] ABSTRACT

A thread milling attachment for engine lathes, particularly for milling a wide variety of special threads on workpieces, is described. The attachment device is readily attachable to an ordinary lathe by mounting to its cross-slide in substitution for the usual compound-rest, and includes a self-powered drive spindle mechanism operative to screw-turn a workpiece forewardly or rearwardly, selectively, with respect to a milling cutter turned by the associated lathe for milling threads on the workpiece the shape of which is controlled by the shape of the milling cutter and the pitch of which is adjustably controlled by an interchangeable lead-screw portion of the drive spindle mechanism.

8 Claims, 2 Drawing Figures

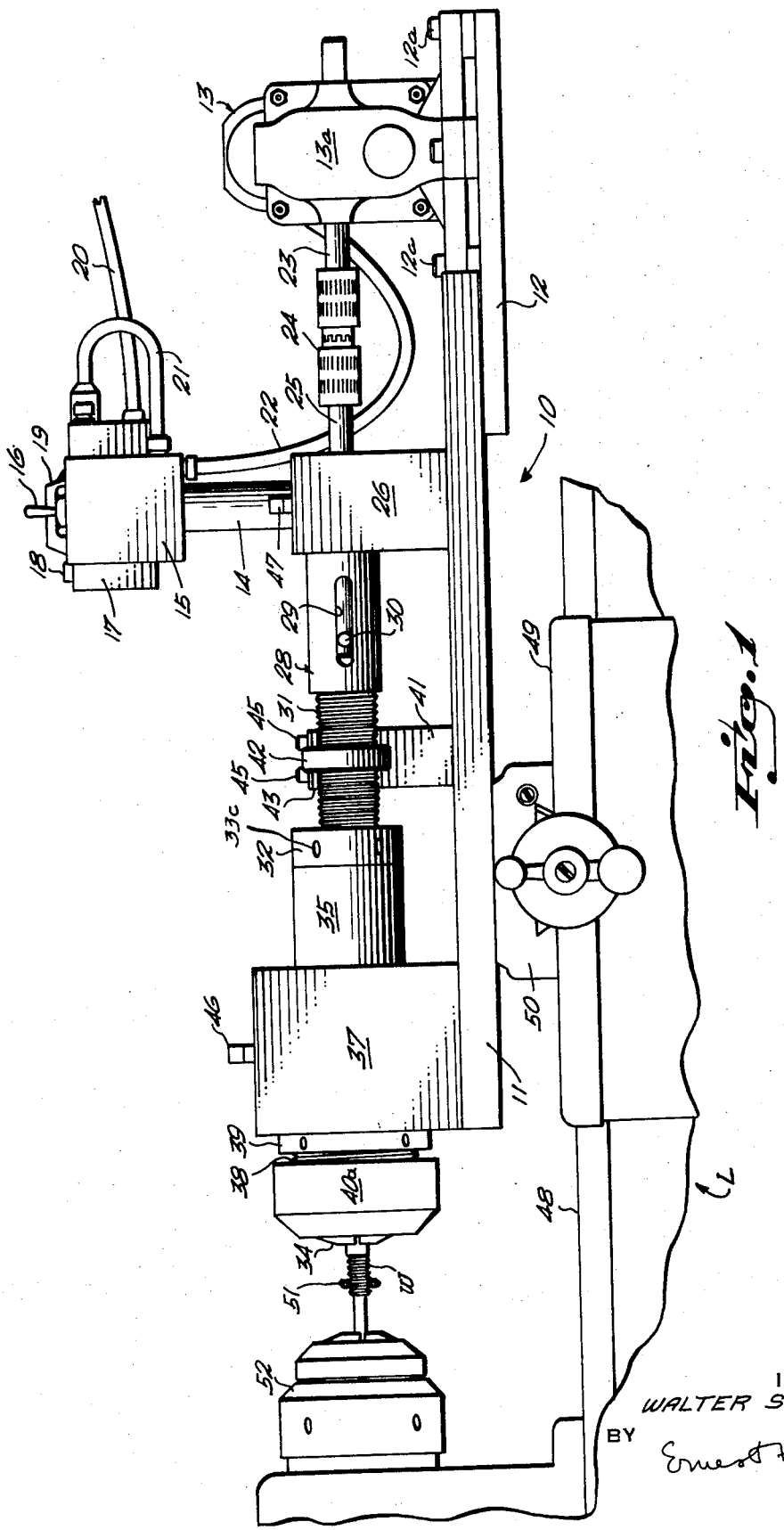

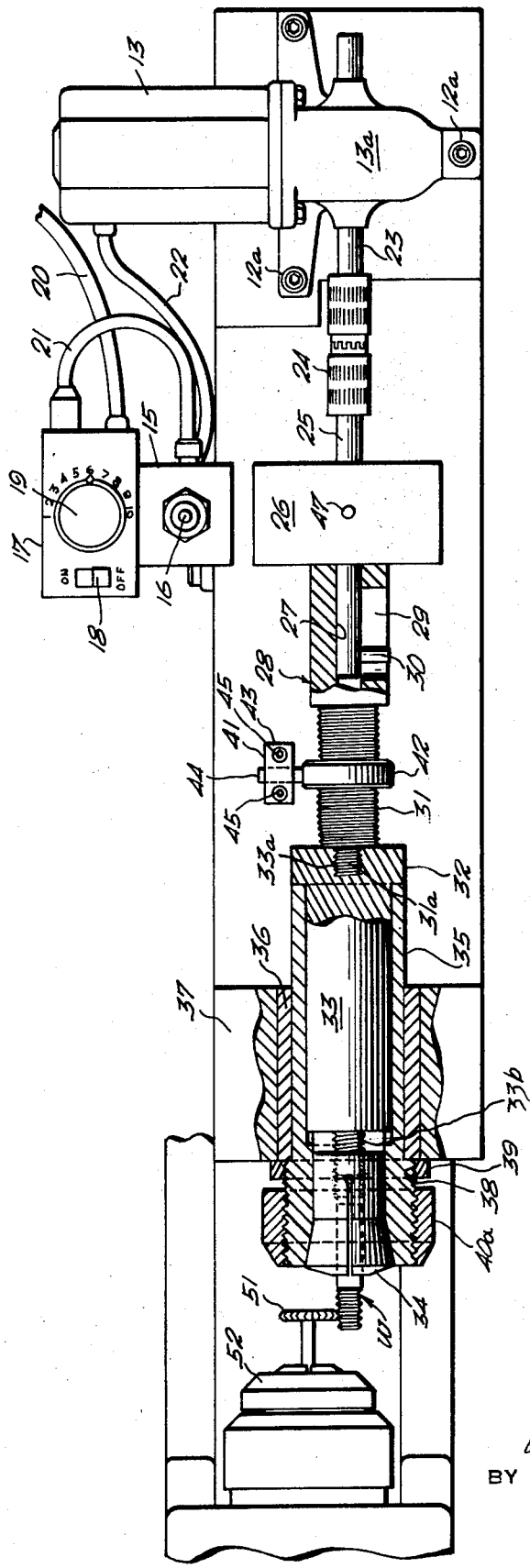

THREAD MILLING ATTACHMENT FOR ENGINE LATHES

This invention relates to metal turning lathes and is directed particularly to a threaded milling attachment device for engine lathes.

It is the principal object of the invention to provide an attachment device for engine lathes that permits the milling of a wide variety of special threads, either exterior of interior, that could not heretofore be produced with the use of an ordinary engine lathe alone.

A more particular object of the invention is to provide a thread milling attachment device that can readily be attached to the lathe cross-slide in substitution for the usual compound-rest and which includes self-powered drive spindle mechanism operative to screw-turn a workpiece forewardly or rearwardly, selectively, with respect to a milling cutter turned by the associated lathe for milling threads on the workpiece the shape of which is controlled by the milling cutter and the pitch of which is controlled by an interchangeable lead-screw portion of the drive mechanism.

Another object of the invention is to provide a thread milling attachment device of the character described wherein the feed rate of the drive spindle is variable over a wide range, both as to foreward and reverse speed, to provide for optimum machining conditions for any given thread milling operation to be performed.

Still another object of the invention is to provide a thread milling attachment device of the above nature which will mill right and left hand threads as well as exterior and interior thread with the same accuracy, and fully down to a shoulder or the bottom of a blind hole, (in the case of interior thread).

Other objects, features and advantages of the invention will be apparent from the following description when read with reference to the accompanying drawings. In the drawings, wherein like reference numerals denote corresponding parts throughout the several views:

FIG. 1 is a front elevational view of a thread-milling attachment device embodying the invention shown attached to an engine lathe; and FIG. 2 is a top plan view, with portions broken away to reveal constructional details, of the attachment device shown in FIG. 1.

Referring now in detail to the drawings, reference numeral 10 designates, generally, a preferred form of thread milling attachment device embodying the invention shown in use with an ordinary engine lathe L (partly illustrated). The thread milling attachment 10 comprises a rectangular metal base plate 11 one end of which has affixed against the underside thereof, in any convenient manner such as by use of machine screws (not illustrated), an outwardly extending motor mount plate 12. Fixed upon the motor mount 12 as by machine screws 12a is an electric drive motor 13 having a speed reduction gear box 13a.

As control means for the drive motor 13, the base plate 11 has fixed thereto, along the back edge and in forewardly spaced relation with respect to said drive motor, an upstanding pedestal 14 supporting, at its upper end, a switch housing 15 mounting a forward and reverse power switch 16. The upper end of the pedestal 14 also supports a second housing 17 supporting an on-off electrical switch 18 and a 10-step rotary speed control switch 19. An electric supply line 20 (partially illustrated) entering the electrical housing 17 and connected in circuit with the on-off switch 18, speed control switch 19 and the forward and reverse power switch 16 through electrical cable 21 and 22, serves to energize the electric drive motor 13 for controlling its operation both with respect to speed and direction of its output drive shaft, as is hereinbelow more particularly described. Since such electrical control circuitry for reversable drive motors is well known, further description herein is not deemed to be necessary.

The output shaft 23 of the motor gear box 13a extends longitudinally above the base plate 11 and connects through a drive coupling 24 with a drive shaft 25. The drive shaft 25 is journalled in a rear bearing block 26 securely affixed upon the base plate 11 in any convenient manner. The drive shaft 25 extends outwardly of the rear bearing block 26 to be slidingly received within the central bore 27 of a main spindle drive sleeve 28. The drive shaft 25, near the outer end thereof, is fitted with a removable, radially outwardly extending drive pin 30, said drive pin being received for back and forth sliding motion in a longitudinally extending slot 29 formed in the rear end portion of the main spindle drive sleeve 28. The main spindle drive sleeve 28, forewardly of the rear end sleeve portion thereof wherein the slot 29 is formed, extends coaxially into an externally threaded lead-screw portion 31 terminating in a reduced-diameter, externally threaded, coaxial stud portion 31a. The externally threaded stud portion 31a is received within an internally threaded coaxial recess 33a in the increased diameter end 32 of a collect draw bar 33 the foreward end of which is formed with an externally threaded, reduced-diameter threaded stud portion 33b. The threaded stud portions 33b of the collet draw bar 33 is threadingly received in a coaxial, internally threaded opening at the rear end of a multi-jaw work-holding collet 34. The collet draw bar 33 is slidingly received for relative coaxial movement in a main work spindle 35 journalled in a bronze main bearing 36 supported by a front main bearing housing 37 suitably affixed upon the base plate 11 in spaced relation with respect to the rear bearing block 26. The main work spindle 35, where it projects outwardly of the front of the main bearing housing 37 is formed with an increased-diameter, internally threaded portion 38 threadingly received upon which is a spanner nut 39 and within which the collect 34 operates. The increased diameter end 32 of the collet draw bar 33 defines an annular shoulder which seats slidingly against the rear end of the main work spindle 35, and is formed about its periphery with spanner tool openings 33c to facilitate turning of said collet draw bar with respect to said main work spindle for actuating the work-holding collet 34 to secure a workpiece W in place. The external threads at the outer end of the main spindle drive sleeve permit assembly thereto of a chuck or face plate for use with parts that will not fit in the collet. A nut 40a will normally be threadingly fitted over the foreward end of the main spindle drive sleeve 28, as illustrated, to protect the threads thereon in instances where the work holding collet 34 is utilized instead of a chuck or face plate.

Means is provided for controlling the travel of the main spindle drive member 28. To this end the base plate 11 has affixed thereto, in upstanding relation, a lead-screw nut support post 41 removably affixed with respect to the upper end of which is a lead screw nut 42. As means for removably and replaceably attaching the lead-screw nut 42 in place, a clamp bar 43 is provided for clamping a radially extending attachment rod 44 forming part of the lead-screw nut 42 with respect to the upper end of the lead-screw nut post 21, such as by use of machine screws 45. It will be understood that the lead screw nut 42 is threadingly received on the externally threaded lead-screw portion 31 of the main spindle drive member 28, so that said spindle drive sleeve member will be moved axially in one direction or the other, that is, in or out with respect to the lathe spindle of a lathe upon which the attachment device is mounted, upon turning of the drive shaft 25. It will also be understood that while the drive shaft 25 is constrained against axial movement with respect to the rear bearing block 26 in which it is journalled, the longitudinally extending slot 29 through which the main spindle drive sleeve 28 is driven by drive pin 30 permits limited axial as well as turning movement of said main drive sleeve.

The rear bearing block 26 and the front main bearing housing 37 are provided, respectively, with upstanding oil cups 46 and 47 for lubricating their journalled members.

As best illustrated in FIG. 1 the thread milling attachment device 10 is attached for co-operative use with an engine lathe L, partially illustrated, by removing the usual compound-rest from the lathe cross slide 50 and securing the base plate 11 thereupon such as by the use of machine screws (not illustrated).

Considering now the operation of the thread milling attachment device, the drawings illustrate a set-up for milling external threads on a rod-like workpiece W secured in the collet 34, securement of the workpiece in the collet having been effected by turning the collet draw bar 33 against the inner end of the main work spindle 35.

A thread milling cutter 51 secured in the lathe spindle 52 is rotated at an appropriate cutting speed after which the drive motor 13 is set into operation by turning the switch 18 to "on" position and setting the switch 16 at "foreward" position. The speed control rotary switch 19 can then be set at an appropriate speed for moving the workpiece control threads forwardly while at the same time turning it so that the milling cutter 51 will reproduce in the workpiece W threads of the same pitch as that of the control threads on the lead-screw portion 31 of the main spindle drive sleeve 28. The combination of gear reduction box 13a associated with drive motor 13 and electrical speed control rotary switch provides for variation in rotary speed of the main spindle drive speed 28, and hence the workpiece W, of from 0 to 60 r.p.m. in increments of approximately 6 r.p.m.

While the thread milling attachment device is illustrated and described herein for use in milling external threads along a rod-like workpiece W, it will be readily apparent that the device is applicable as well to the milling of internal threads with the use of appropriate thread-cutting tools supported by the lathe spindle 52.

Various important advantages of my thread milling attachment device are as follows: It can readily be attached for use in association with any engine lathe. It permits thread to be milled on parts requiring special threads, such as fittings that have shoulders and wherein the thread is required to be up to the shoulder without a relief. It can be used to mill odd sized threads on parts that are not standard. It can mill six to 80 threads per inch simply by changing the lead-screw or drive sleeve 28 and its associated lead-screw nut 42, which can be effected in a few minutes. It can mill all classes of threads, both right and left hand. It can mill both inside and outside threads on extraordinary thin parts. It can mill threads on splined parts after the splines have been machined. It can mill thread on odd-shaped pieces. It can be used to mill oversize or undersize threads on special parts.

While I have illustrated and described herein only one form in which my invention can conveniently be embodied in practice, it is to be understood that this form is given by way of example only and not in a limiting sense. The invention, in brief, comprises all the embodiments and modifications coming within the scope and spirit of the following claims.

What I claim as new and desire to secure by Letters Patent is:

1. A thread milling attachment for milling lathes comprising, in combination, a base member adapted to be attached to the cross slide of a lathe, a rotary drive shaft, mechanism for journalling said drive shaft with respect to and above said base plate, a drive motor secured with respect to said base plate and having a rotary output shaft mechanically connected with one end of said drive shaft for turning said drive shaft, means for controlling the speed and direction of turning of said output shaft of said drive motor, a main work spindle, bearing mechanism fixed upon said base plate in spaced relation with respect to said journalling mechanism and in coaxial relation with respect thereto for rotationally and longitudinally journalling said main work spindle in coaxial relation with respect to said drive shaft, a spindle drive member interconnecting one end of said main work spindle with the other end of said drive shaft for co-operative rotary motion thereof, interconnection means between said spindle drive member and said drive shaft comprising mechanism permitting limited axial movement of said spindle drive member with respect to said drive shaft, said spindle drive member comprising an externally threaded portion, a lead-screw nut threadingly received on said externally threaded portion, means for securing said lead-screw nut in fixed relation with respect to said base plate, and means at the other end of said main work spindle for removably attaching a workpiece to be machined.

2. A thread milling attachment device for milling lathes as defined in claim 1, wherein said mechanism permitting limited axial movement comprises a spindle drive sleeve portion at one end of said spindle drive member and defining a central bore within said other end of said drive shaft is slidingly received, a longitudinally extending slot in said spindle drive sleeve, and a drive pin extending radially of an outer end portion of said other end of said drive shaft and through said longitudinally extending slot.

3. A thread milling attachment device for milling lathes as defined in claim 1, wherein said means for removably attaching a workpiece to be received comprises a collet having a collet draw bar extending coaxially through a coaxial central opening in said main work spindle, and a collet lock nut threadingly received on the outer end of said collet draw bar for securing it in axially adjusted position with respect to said main work spindle for securing a workpiece in said collet.

4. A thread milling attachment device for milling lathes as defined in claim 3, wherein said spindle drive member comprises a reduced-diameter, externally threaded portion at one end threadingly received within a coaxial threaded recess in said outer end of said collet draw bar.

5. A thread milling attachment device for milling lathes as defined in claim 1, wherein said means for controlling the speed and direction of the output shaft of said drive motor comprises a gear reduction box for mechanically reducing speed and electric circuit means for step-wisely electrically adjusting motor rotor output speed.

6. A thread milling attachment device for milling lathes as defined in claim 2, wherein said means for removably attaching a workpiece to be received comprises a collet having a collet draw bar extending coaxially through a coaxial central opening in said main work spindle, and a collet lock nut threadingly received on the outer end of said collet draw bar for securing it in axially adjusted position with respect to said main work spindle for securing a workpiece in said collet.

7. A thread milling attachment device for milling lathes as defined in claim 6, wherein said spindle drive member comprises a reduced-diameter, externally threaded portion at one end threadingly received within a coaxial threaded recess in said outer end of said collet draw bar.

8. A thread milling attachment device for milling lathes as defined in claim 7, wherein said means for controlling the speed and direction of the output shaft of said drive motor comprises a gear reduction box for mechanically reducing speed and electric circuit means for step-wisely electrically adjusting motor rotor output speed.

* * * * *